Figure 1:
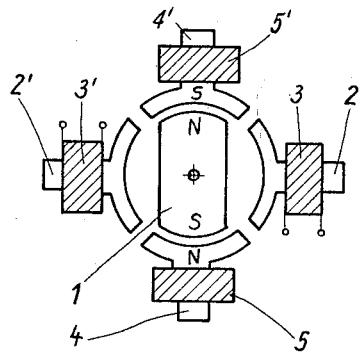

May 7, 1963 K. TREDOPP 3,088,388
PHOTOGRAPHIC CAMERA
Filed July 18, 1960

INVENTOR.

United States Patent Office 3,088,388
Patented May 7, 1963

3,088,388
PHOTOGRAPHIC CAMERA
Karl Tredopp, Dusseldorf, Germany, assignor to Robot-Foto G.m.b.H., & Co., Dusseldorf, Germany
Filed July 18, 1960, Ser. No. 43,474
Claims priority, application Germany July 18, 1959
7 Claims. (Cl. 95—31)

This invention relates to a photographic camera, in particular for recording purposes. It is well known with such cameras to drive both the exposure shutter and the film-movement mechanism electrically. By means of mechanical gearing provision is made that the film feed is effected before or after the actuation of the exposure shutter. With well known cameras of this type, there are considerable difficulties in controlling quick exposure sequences, e.g. of ten exposures per second, without making use of the principle of moving-picture filming. Moving-picture filming does not allow a variation of the time of exposure, which is of great importance for a recording camera. The invention has for its object, with a recording camera having an electrically driven shutter and automatic film feed to control also quick exposure sequences with adjustable time of exposure, complicated mechanical gearing being avoided.

According to the invention this is achieved by providing one electric drive motor for the shutter drive and one for the film feed, the film-feed driving motor being controlled by a contacting device mounted on the shaft of the shutter driving motor. By the use of separate electric motors and of an electric contacting device rotating therewith for the control of the film feed motor the acceleration forces are considerably diminished. Mechanical gearing with unwanted acceleration influences are avoided so that no strains and stresses on mechanical stops or the like can occur.

In a particularly advantageous manner the invention can be put into practice by using as driving motor for the shutter drive and/or the film feed drive a rotary magnet motor having a winding with reversible polarity. Rotary magnet motors the magnetic rotor of which carries out its rotary movement in a stepwise manner and, with every step, adjusts according to electromagnetic stator poles, are well known in the art. The use of such motors within the scope of the invention offers the advantage that by suitably switching on or off of stator windings the rotor can optionally be rotated through a given angle or be retained in a well defined position by the action of the stator field without the use of stops.

In a preferred embodiment of the invention the rotary magnet motor is provided with two stator windings displaced by 90° with respect to each other and switchable independently from each other by means of a contacting device mounted on the rotor shaft. The contacting device can then be designed in such a manner that the rotary magnet performs a rotary movement optionally through 90° or 180° and stops after such rotation electrically fettered with strong damping. With such an arrangement provision can be made that the exposure and the film feed is completed each after a 180°-rotation of the driving motors.

Figure 2:
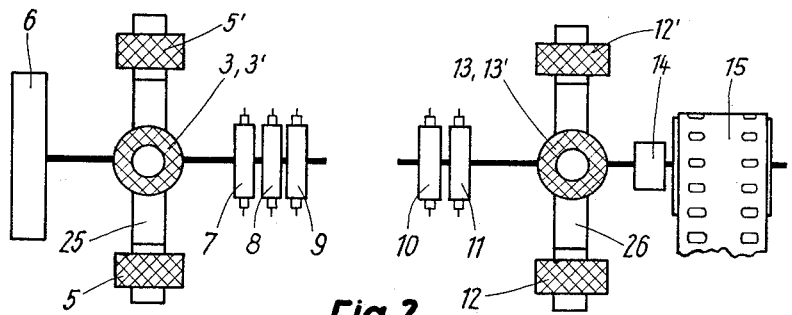
Figure 3:
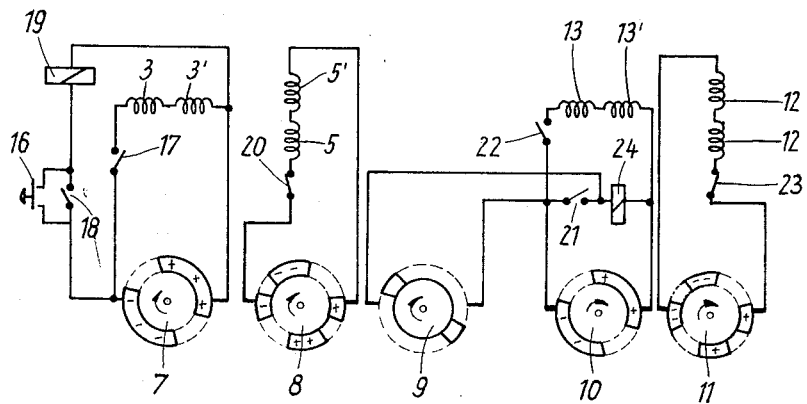

FIG. 1 schematically shows a rotary-magnet motor.
FIGS. 2 and 3 show as an embodiment of the invention a wiring diagram with two rotary-magnet motors of the type as shown in FIG. 1 and the associated contacting devices.

Referring now to FIG. 1, the rotary-magnet motor comprises a rotor 1 consisting of a permanent magnet with N- and S-pole faces. Two stator systems 2, 2' and 4, 4' displaced by 90° with respect to each other are provided for, which can be energized independently from each other. The field windings 3 and 3' and 5, 5' respectively are wound and connected in such a manner that upon energization each winding forms diametrically opposed a north magnetic pole and a south magnetic pole for each stator system. With the basic position as shown in the drawings the stator windings 5 and 5' are switched on whereby the magnet motor 1 is magnetically fettered by the fields of the stators 4 and 4'. If by a switching operation the magnetic field of the stators 4, 4' is switched off and the field of the stators 2, 2' is switched on, the magnet motor 1 performs a 90°-rotation. If, however, after 90°-rotation, the field of the stators 2, 2' is switched off by means of a contacting device rotating with rotor 1, and the field of the stators 4, 4' is switched on with reversed polarity as before, a further rotation of the magnet rotor 1 through 90° takes place, so that the latter after 180°-rotation is retained magnetically between the poles of the stator system 4, 4'. It is therefore possible optionally to cause a rotary movement through 90° or 180°.

In FIG. 2 an arrangement is shown in which two rotary magnet motors of the type shown in FIG. 1 coact. One motor 25 actuating the exposure shutter 6 and having the stator windings 3, 3' and 5, 5' carries on its rotor shaft a contacting device consisting of the contact discs 7, 8, 9. Furthermore with its rotor shaft it acts on the camera shutter 6, which is represented here only schematically. A similar rotary magnet motor 26 driving the film moving mechanism 15 via a gear mechanism 14 has corresponding stator windings 12, 12' and 13, 13' as well as a contacting device consisting of contact discs 10, 11 and mounted on its rotor shaft.

FIG. 3 shows the wiring diagram of the arrangement according to FIG. 2. Therein only the contact discs of the motors 25 and 26 as well as the electric circuit components connected with it are shown. The current supply leads not shown to the discs 7, 8, 10, 11 are intimated by polarity symbols (+ or −) within the disc segments. Thus is to be assumed that an appropriate voltage with the indicated polarity is permanently connected to the respective segments. The two segments of the disc 9 are connected with each other and serve only for the temporary electric connection of the two supply leads. A control relay with one set of normally closed secondary contacts and two sets of normally open secondary contacts are associated with each motor 25 and 26, namely the relay 19 pertaining to motor 25 with contacts 17, 18 and 20 and the relay 24 with the contacts 21, 22 and 23 pertaining to motor 26. The contact 18 can be bridged by an operating switch 16. The operating switch is so designed in a manner not shown that either a momentary contact (self-wiping contact) or a sustained contact can be made.

In the basic position shown, the stator windings 5, 5' and 12, 12' are traversed by current via the contact discs 8 and 11 respectively and the normally closed contacts 20 and 23. Thus the magnet rotors of both magnet motors are magnetically fettered. If now a momentary contact is made by 16, the control circuit of relay 19 is connected to current and closes its operating contacts 17 and 18 at the same time opening the contact 20. The stator winding 3, 3' is switched on through the contact 17 and the stator winding 5, 5' is switched off by the contact 20. The contacts 18 maintain the energization of the relay 19. As explained above, because of this switching operation the rotor magnet of the motor 25 rotates together with the contact discs 7, 8, 9 in the direction of the arrow drawn in FIG. 3. After a rotation of about 90° to 100° the circuit of the relay 19 is interrupted by the contact disc 7. The stator winding 5, 5' is now again connected to current through the contact disc 8 and contacts 20 whereas the stator winding 3, 3' is switched off. As described hereinbefore, the rotor continues this movement until it is again magnetically retained after a 180°-rotation, the stator winding 5, 5' being energized, a reversal of polarity of the stator windings 3, 3' and 5, 5' respectively having, however, taken place.

During this 180°-rotation of the motor 25, by which the exposure of the camera has been effected, also the contact disc 9 has rotated therewith. After about 150°-rotation of the motor 25 the operating circuit of relay 24 is energized for a short time through the contact disc 9, so that the described operation is repeated with respect to the motor 26 and the rotor thereof rotates by 180° thereby effecting the film feed. This is achieved by connecting the control circuit of the relay 24 to current, which closes its contacts 21, 22 at the same time opening the normally closed contact 23. The stator winding 13, 13' is switched on through the contact 22 and the stator winding 12, 12' is switched off by the contact 23. The contact 21 maintains the energization of the relay 24. As explained above, because of this switching operation the rotor magnet of the motor 26 rotates together with the contact discs 10, 11 in direction of the arrow. After a rotation of about 90° to 100° the circuit of the relay 24 is interrupted by the contact disc 10. The stator winding 12, 12' is now again connected to current through the contact disc 11 and contact 23, whereas the stator winding 13, 13' is switched off. The rotor continues its movement until it is again magnetically retained after a 180° rotation, the stator winding 12, 12' being energized, a reversal of polarity of the stator windings 13, 13' and 12, 12' respectively having taken place.

If a time exposure is to be made, the rotor of motor 25 must be stopped after a 90°-rotation. This is achieved in that a sustained contact is made by the operating switch 16. The result of this is that the stator winding 3, 3' remains switched on during the duration of the contact making, so that the rotor remains in the 90°-position until the operating switch is opened.

A 180°-rotation of the rotary magnet motors can take place very quickly so that a quick exposure sequence can be achieved.

What I claim is:

1. In a camera having a shutter and a film feed, an electric shutter and film feed drive system comprising: a shutter drive electric motor having a drive shaft operatively connected with said shutter and a film feed drive electric motor having a drive shaft operatively connected with said film feed, both of said motors being of the rotary magnet type each having a permanent magnet rotor and a plurality of angularly spaced stator systems including stator windings, first switch control means responsive to the angular position of said shaft of said shutter motor to control the energizing of said shutter motor windings and thus the stop positions and motion of said shutter motor, second switch control means responsive to the angular positions of both said shaft of said shutter motor and said shaft of said film feed motor to control the energizing of said film feed motor windings and thus the stop positions and motion of said film feed motor, and an operating switch electrically connected with said first control means for initiating activation thereof, said first and second control means being so arranged that the momentary closing of said operating switch causes rotation of said shaft of said shutter motor from a first stop position through a predetermined angle to operate the shutter to a second stop position and that rotation of said shaft of said film feed motor is started at a first stop position approximately as the movement of said shaft of said shutter motor comes to its second stop position and continuing through a predetermined angle to operate the film feed to a second stop position.

2. The system of claim 1 wherein the shutter drive motor has two stator systems angularly spaced 90° apart.

3. The system of claim 2 wherein the film feed drive motor is substantially identical in essential structure to the shutter drive motor.

4. The system of claim 1 wherein both drive motors comprise two stator systems angularly spaced 90° apart and the predetermined angle of rotation of the drive shaft of the shutter motor is 180°.

5. The system of claim 3 wherein the first switch control means includes a control relay having the operating switch of the electric drive system connected in the relay control circuit, said relay having a set of normally open secondary contacts connected in parallel with said operating switch and a set of normally open secondary contacts connected as a switch in the circuit of the winding of one stator system and a set of normally closed secondary contacts connected as a switch in the circuit of the winding of the other stator system, whereby the relay control circuit may be kept closed by said operating switch regardless of the position of the secondary contacts which are in parallel with said operating switch.

6. The system of claim 5 wherein the second switch control means includes a control relay having two sets of normally open secondary contacts and one set of normally closed secondary contacts, and an operating switch responsive to the angular position of the shaft of the shutter motor connected in the relay control circuit and arranged to energize said control circuit only momentarily after said shaft has rotated about 150° from normal stop position, one of said sets of normally open contacts being connected to parallel with said operating switch, the other of said sets of normally open contacts being connected as a switch in the circuit of the winding of one stator system of the film feed motor, and the set of normally closed contacts being connected as a switch in the circuit of the winding of the other stator system, the arrangement being such that the shaft of said film feed motor is caused to rotate 180° upon the energizing of said control circuit of said relay.

7. In a camera having a shutter and a film feed, an electric shutter and film feed drive system comprising: a shutter drive electric motor having a rotary armature and a drive shaft affixed thereto and operatively connected with said shutter, a film feed electric motor having a rotary armature and a drive shaft operatively connected with said drive shaft of said shutter drive electric motor, and electromechanical means for controlling the action of said film feed motor, said means including an electrical contact switch mechanism connected with said drive shaft of said shutter drive electric motor and responsive to the angular position thereof to effect necessary electrical connections to operate said film feed electric motor.

References Cited in the file of this patent

UNITED STATES PATENTS

| 2,232,240 | Jones | Feb. 18, 1941 |
| 2,267,844 | Stancil | Dec. 30, 1941 |
| 2,679,790 | Clark | June 1, 1954 |
| 2,791,933 | Crockett | May 14, 1957 |
| 2,950,663 | Warshawsky | Aug. 30, 1960 |

FOREIGN PATENTS

| 708,171 | Germany | July 14, 1941 |